(12) United States Patent
Ismail et al.

(10) Patent No.: US 11,074,211 B2
(45) Date of Patent: Jul. 27, 2021

(54) MANAGEMENT OF PRIORITY OF DATA TRANSMISSION ON A BUS

(71) Applicant: Intel Corporation, Santa Clara, CA (US)

(72) Inventors: Abdul R. Ismail, Beaverton, OR (US); Rajaram Regupathy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 246 days.

(21) Appl. No.: 16/006,682

(22) Filed: Jun. 12, 2018

(65) Prior Publication Data
US 2019/0042523 A1 Feb. 7, 2019

(51) Int. Cl.
*G06F 13/42* (2006.01)
*G06F 13/38* (2006.01)

(52) U.S. Cl.
CPC ........ *G06F 13/4282* (2013.01); *G06F 13/385* (2013.01); *G06F 2213/0042* (2013.01)

(58) Field of Classification Search
CPC ............... G06F 13/4282; G06F 13/385; G06F 2213/0042
See application file for complete search history.

(56) References Cited

U.S. PATENT DOCUMENTS

| | | | |
|---|---|---|---|
| 6,067,301 A * | 5/2000 | Aatresh | H04L 47/10 370/418 |
| 6,658,512 B1 * | 12/2003 | Gokulrangan | H04L 47/11 370/232 |
| 9,930,538 B1 * | 3/2018 | Wong | H04W 88/08 |
| 2004/0019731 A1 * | 1/2004 | Brown | G06F 13/3625 710/310 |
| 2006/0013559 A1 * | 1/2006 | Koo | G06F 13/385 386/231 |
| 2006/0026333 A1 * | 2/2006 | Parr | G06F 13/385 710/313 |
| 2006/0187830 A1 * | 8/2006 | Nam | H04L 47/6215 370/229 |
| 2007/0189169 A1 * | 8/2007 | Wu | H04L 47/2441 370/235 |
| 2009/0031057 A1 * | 1/2009 | Ghosalkar | G06F 3/0613 710/38 |
| 2014/0289357 A1 * | 9/2014 | Staudenmaier | G06F 9/5083 709/213 |

(Continued)

*Primary Examiner* — Tim T Vo
*Assistant Examiner* — Herve Iradukunda
(74) *Attorney, Agent, or Firm* — Green, Howard & Mughal LLP.

(57) ABSTRACT

An apparatus is provided, where the apparatus includes a plurality of input/output (I/O) ports and a controller. A first port, a second port, and a third port are to be respectively coupled to a first device with a first class type, a second device with a second class type, and a third device with a third class type. The controller is to determine that individual ones of the first and second devices are to perform asynchronous transfer with the apparatus, and that the third device is to perform a transfer that is different from the asynchronous transfer. The controller is to allocate bandwidth to the first and second I/O ports, based at least in part on the first class type and the second class type. The controller is to ignore the third class type, while allocating bandwidth to the third I/O port.

18 Claims, 6 Drawing Sheets

(56) References Cited

U.S. PATENT DOCUMENTS

| | | | |
|---|---|---|---|
| 2014/0337558 A1* | 11/2014 | Powers | G06F 13/4072 |
| | | | 710/313 |
| 2015/0149639 A1* | 5/2015 | Ismail | G06F 13/4282 |
| | | | 710/33 |
| 2017/0064006 A1* | 3/2017 | Xue | H04L 67/20 |

* cited by examiner

MANAGEMENT OF PRIORITY OF DATA TRANSMISSION ON A BUS

BACKGROUND

In a Universal Serial Bus (USB) architecture, when a host is coupled to multiple devices, transfer types associated with the devices are considered while allocating bandwidths to the devices. For example, devices engaged in control transfer, interrupt transfer, and isochronous transfer are given priority while allocating bandwidth. Bandwidth to devices engaged in bulk transfer (also referred to as asynchronous transfer) are allocated using round robin scheduling. Thus, two devices that are engaged in bulk transfer are given same priority in the round robin scheduling, irrespective of, for example, delay sensitivity of the two devices.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

In an example, a USB device may engage in one of control transfer, interrupt transfer, isochronous transfer, or bulk transfer (also referred to as asynchronous transfer) with a host. Generally, control transfer, interrupt transfer, and isochronous transfer are delay sensitive, whereas bulk transfer can relatively tolerate some latency. Thus, while allocating bandwidth to various USB devices, the host may prioritize bandwidth allocation for control transfer, interrupt transfer, and isochronous transfer. Subsequently, the host may allocate bandwidth for bulk transfer. If multiple devices that are to engage in bulk transfer are coupled to the host, conventionally, the host uses round robin scheduling to allocate bandwidth to such devices.

In an example, assume a first device and a second device that are each to be engaged in bulk transfer with the host. Instead of allocating bandwidth using round robin scheduling (e.g., which may blindly allocate bandwidth to the two devices), in some embodiments of this disclosure, the host assigns bandwidth to the first and second devices using weighted round robin scheduling. For example, the host assigns first and second weights to the first and second devices, respectively, and operates the weighted round robin scheduling based on such weights. In an example, the weighted round robin scheduling is used for devices that are engaged in bulk transfer with the host, and not for devices that are engaged in any of control transfer, interrupt transfer, or isochronous transfer.

In some embodiments, the weights to the devices are assigned based on USB device class functions associated with the devices. For example, a class function of a device may be somewhat indicative of delay tolerance of the device. Thus, merely as an example, a device with a class function indicative of higher tolerance for delay may be assigned a lower weight than, for example, another device with another class function indicative of lower tolerance for delay. Other factors, such as data rate requested by the devices, user preferences, etc., may also be taken into account while allocating the weights.

Thus, the weighted round robin scheduling correlates allocation of bandwidth with class functions of the devices, thereby somewhat correlating the allocation of bandwidth with delay tolerances of the devices. The weighted round robin scheduling also correlates allocation of bandwidth with requested data rate, user preferences, etc. Accordingly, the weighted round robin scheduling improves speed of USB bus communication, bandwidth allocation based on delay tolerances, enhanced user experience, etc. Other technical effects will be evident from the various embodiments and figures.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" or "some embodiments" means that a particular feature, structure, function, or characteristic described in connection with the embodiment is included in at least one embodiment of the invention. Thus, the appearances of the phrase "in an embodiment" or "in one embodiment" or "some embodiments" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

It is pointed out that those elements of the figures having the same reference numbers (or names) as the elements of any other figure can operate or function in any manner similar to that described, but are not limited to such.

Figure 1:
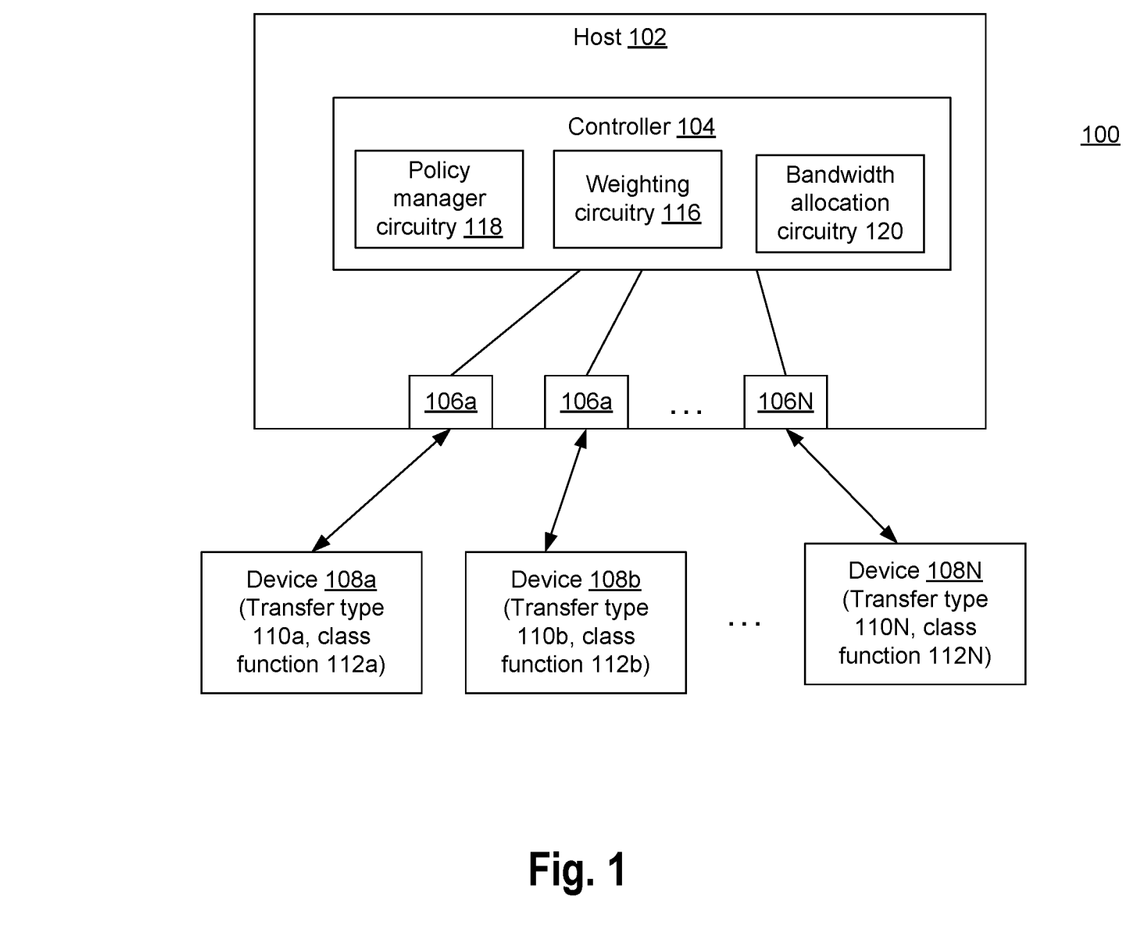
FIG. 1 schematically illustrates a system comprising a host and a plurality of devices coupled to the host respectively via a plurality of Input/Output (I/O) ports, wherein the host is to allocate bandwidth for communication with one or more of the devices based at least in part on a class function of the devices, according to some embodiments.

FIG. 1 schematically illustrates a system 100 comprising a host 102 and a plurality of devices 108a, 108b, . . . , 108N coupled to the host 102 respectively via Input/Output (I/O) ports 106a, 106b, . . . , 106N, wherein the host 102 is to allocate bandwidth for communication with one or more of the devices 108 based at least in part on a class function (also referred to as a class type) of the devices 108, according to some embodiments. In some embodiments, the host 102 may be any appropriate computing system or computing platform, e.g., a server system, a server rack, a laptop, a desktop, a mobile computing device, a cellular phone, a tablet, a wearable device, and/or the like. Individual ones of the devices 108 may be any appropriate USB compliant device, such as a display, a flash drive, a printer, a webcam, a USB hub, a keyboard, a mouse, a mass storage drive, a camera, a smart phone, a consumer electronic device, a USB compliant computing device, and/or the like.

Elements referred to herein with a common reference label followed by a particular number or alphabet may be collectively referred to by the reference label alone. For example, devices 108a, 108b, . . . , 108N may be collectively and generally referred to as devices 108 in plural, and device 108 in singular. Similarly, I/O ports 106a, . . . , 106N may be collectively and generally referred to as ports 106 in plural, and port 106 in singular.

In some embodiments, the host 102 may comprise a controller 104 that may allocate bandwidth to the ports 106, e.g., to communicate with the devices 108. For example, a total bandwidth for all the ports 106 may be bound by an upper limit. Thus, the controller 104 may prioritize the ports 106 to communicate with the devices 108. As will be discussed herein in further details, the controller 1054 may prioritize the ports 106 based at least in part on transfer types associated with the devices 108 coupled to the ports 106, class functions associated with the devices 108, data rate requested by the devices 108, user preferences, etc.

In an example, the I/O ports (also referred to as ports) 106 may be Universal Serial Bus (USB) ports. In another example, the ports 106 may be any appropriate type of ports. Various examples and embodiments herein are discussed assuming that the ports 106 are USB ports—however, such assumption does not limit the scope of this disclosure, and the teachings of this disclosure may be applied to other types of I/O ports as well, e.g., lighting ports, Thunderbolt ports, Ethernet ports, etc.

USB technology has evolved over more than a decade as a ubiquitous interface for peripherals, to connect the peripherals to compute systems. The evolution of USB bus speed in these years starts from to 1.5 Megabits per seconds (Mbps) in USB 1.1 specification to about 10 Gigabits per second (Gbps) in the USB 3.1 specification. With the introduction of USB Type-C (USB-C) port and USB Power Delivery specifications, the USB-C port has extended the USB port functionality to power and display. The USB-C port has enabled to expand the bandwidth of USB to 20 Gbps with the introduction of USB 3.2 specification, which uses addition signal lines made available by the USB-C ports.

To cater to the different kind of peripherals, USB specification provides different types of transfers, such as (i) control transfer, (ii) interrupt transfer, (iii) isochronous transfer, and (iv) bulk transfer (also referred to as asynchronous transfer). A transfer type may be selected for a specific endpoint or device according to the requirements of the device and the software. The transfer type of a specific endpoint associated with a device 108 may be indicated in the endpoint descriptor transmitted by a device 108 to the host 102.

Control transfers may be usually used for command and status operations between the software on the host 102 and a device 108, and may be used to set up a USB device with enumeration functions. Control transfers may comprise bursty, non-periodic, random packets, which may be initiated by a USB host 102 and use best effort delivery. Control transfer may be used during enumeration, for advertising capability of a device, etc.

Interrupt transfers are typically non-periodic, small device-initiated communication requiring bounded latency. An Interrupt request is queued by the device until the host polls the USB device asking for data. The data may be of relatively small amounts and may be infrequent, or in an asynchronous time frame. Interrupt transfer type may guarantee a maximum service period, and delivery may be re-attempted in the next period if there is an error on the bus. Examples of interrupt transfer may be typing in a USB keyboard, using a USB mouse, etc., where each key stroke in the key board or the mouse may generate data that are transmitted to the host as interrupt transfer.

Bulk transfers (also referred to as asynchronous transfers) are non-periodic, large bursty communication typically used for a transfer that can use any available bandwidth and can also be delayed until bandwidth is available. Bulk Transfer may be typically used for devices that transfer large amounts of non-time sensitive data, and that can use any available bandwidth, such as printers, scanners, flash drive, displays, etc. For example, transferring a large file from one storage to another, transmitting data to a display screen for display, etc. may be bulk transfer. Bulk transfer allows access to the USB bus on an "as-available" basis, guarantees the data transfer but not the latency, and provides an error check mechanism with retries attempts. Thus, bulk transfers have guaranteed delivery and not guaranteed bandwidth. If part of the USB bandwidth is not being used for other transfers (e.g., not used for control transfer, interrupt transfer, isochronous transfer), the system may use the remaining bandwidth for bulk transfer.

Isochronous transfers are used when working with isochronous data. Isochronous transfers provide periodic, continuous communication between host and device. Isochronous Transfer is most commonly used for time-sensitive information, such as multimedia streams, telephony, webcam, audio devices, etc.

In some embodiments, each of the devices 108 of the system 100 (or an endpoint of individual devices 108) may have an associated transfer type. For example, devices 108*a*, 108*b*, . . . , 108N may have transfer types 110*a*, 110*b*, . . . , 110N, respectively. Individual ones of the transfer types 110*a*, 110*b*, . . . , 110N may be corresponding one of (i) control transfer type, (ii) interrupt transfer type, (iii) isochronous transfer type, or (iv) bulk transfer type. The transfer type of a device 108 (or an endpoint of the device 108) may be indicated in the endpoint descriptor of the endpoint of the device 108. In an example, the transfer type associated with a device may change with time (e.g., a device 108 may initially engage in control transfer during enumeration, and subsequently engage in another type of transfer).

In some embodiments, in addition to a transfer type, a device 108 (or an associated end point of a device 108) may be associated with a corresponding class type (also referred to as class function). For example, the device 108*a* may have a class type 112*a*, the device 108*b* may have a class type 112*b*, the device 108N may have a class type 112N, and so on. The class type may indicate a class or a functionality of the device. The class type or functionality of a USB device 108 may be defined by a class code sent by the device 108 to the host 102 (e.g., to the controller 104 of the host 102). This may allow the host 102 to load software modules for the device 108, and to support new devices from different manufacturers. The USB device class specification (e.g., USB device class specification 1.0, or any versions thereof) defines the class codes associated with various class types. In an example, a class type of a device may be somewhat indicative of delay tolerance of the device.

Examples of class types may include an audio class (e.g., which may include USB devices such as speakers, microphone, sound card, etc.), Human interface device (HID) class (e.g., which may include USB devices such as keyboard, mouse, joystick, etc.), Physical Interface Device (PID) class (e.g., which may include USB devices such as force feedback joystick), video class (e.g., which may include USB devices such as webcam), audio/video (A/V) class (e.g., which may include USB devices such as webcam, television), printer class, mass storage class (e.g., which may include USB devices such as USB flash drive, memory card reader, digital audio player, digital camera, external drive), and/or the like. Examples of class types may include one or more of: unspecified class, audio class, communications and CDC control class, HID (Human Interface Device) class, physical class, image class, printer class, mass storage class, USB Hub class, CDC-data class, smart card class, content security class, video class, personal healthcare class, audio/video devices class, billboard device class, USB type-C bridge class, diagnostic device class, wireless controller class, miscellaneous class, application Specific class, vendor specific class, and/or the like, e.g., as defined in the USB class specification.

Each class type may have an assigned class code. Merely as an example, USB device class specification has assigned class code 01h to audio class, class code 03h to Human interface device class, class code 05h to Physical Interface Device class, class code 0EH to video class, class code 10h to audio/video (A/V) class, class code 07h to printer class, class code 08h to mass storage class, and so on. Various class types and associated class codes discussed herein are merely examples and do not limit the scope of this disclosure.

Thus, as discussed herein, a device 108 may have a corresponding transfer type 110 and a corresponding class type 112. For example, a USB keyboard may be of Human interface device HID class. During enumeration, the keyboard may perform a control transfer; and during operation, the keyboard may execute interrupt transfer. In another example, a USB display device may be an audio/video class type and may use asynchronous transfer during normal operation (and may use control transfer during enumeration). Similarly, a mass storage device (e.g., a USB flash drive) may be a mass storage class type and may also use asynchronous transfer.

Referring again to FIG. 1, in some embodiments, the controller 104 comprises a weighting circuitry 116 (also referred to as circuitry 116), a policy manager circuitry 118 (also referred to as circuitry 118), and a bandwidth allocation circuitry 120 (also referred to as circuitry 120). The circuitry 120 allocates bandwidth to one or more of the ports 106a, . . . , 106N, based on input from the circuitries 116 and/or 118.

As will be discussed herein in further details, the circuitry 118 receives user input and facilitates in prioritizing bandwidth allocation, based on such user input. As will also be discussed herein in further details, the circuitry 116 takes into account class functions of a device, data rate requested by the device, feedback from the circuitry 118, etc., to determine weights for various devices 108 that are engaged in asynchronous transfer. The circuitry 120 may receive the weights from the circuitry 116 and may allocate bandwidth for data transfer to the devices 108 (e.g., allocate bandwidth to devices that are engaged in asynchronous transfer), based at least in part on the weights, as will be discussed in further details herein.

In some embodiments, if a device 108 has a transfer type of any of control transfer, interrupt transfer, or isochronous transfer, the circuitry 120 may allocate bandwidth to the device 108, where such allocation may not be based on the circuitries 116 or 118. Thus, in an example, bandwidth allocation for control transfer, interrupt transfer, and isochronous transfer may be independent of the output of the circuitries 116, 118. For example, as the control transfer, interrupt transfer, and/or isochronous transfer are relatively more sensitive to time delay or latency (e.g., compared to asynchronous transfer), the circuitry 120 prioritizes bandwidth allocation for these transfer types—accordingly, the circuitry 120 may not take into account the circuitries 116 and 118 while allocating bandwidth for control transfer, interrupt transfer, or isochronous transfer.

Thus, bandwidth allocation for control transfer, interrupt transfer, or isochronous transfer may be independent of the class function of the devices, weights output by the circuitry 116, policy output of the policy manager circuitry 118, data rate requested, etc. For example, the circuitry 120 may not take into account these factors (e.g., ignore these factors) while allocating bandwidth for control transfer, interrupt transfer, or isochronous transfer.

However, asynchronous or bulk transfers may be typically used for devices that transfer large amounts of non-time sensitive data (e.g., less time sensitive compared to control transfer, interrupt transfer, and isochronous transfer), and that can use any available bandwidth, such as printers, scanners, flash drive, displays, etc. For example, after allocating bandwidth for control transfer, interrupt transfer, and isochronous transfer, remaining bandwidth may be allocated for asynchronous transfer. Asynchronous transfer guarantees the data transfer but not the latency. Thus, asynchronous transfers have guaranteed delivery and not guaranteed bandwidth. In some embodiments, the circuitry 120, when allocating bandwidth for devices 108 that are to perform asynchronous or bulk transfers, takes into account the output of the circuitries 116, 118.

For example, assume there are five devices, 108a, 108b, 108c, 108d, and 108e, coupled to respective ports 106a, 106b, 106c, 106d, and 106e of the host 102. Assume, merely as examples, that the device 108a is to perform interrupt transfer with the port 106a (e.g., the device 108a is a USB keyboard); and the device 108b is to perform an isochronous transfer with the port 106b (e.g., the device 108b is a webcam). As the devices 108a and 108b are to respectively perform interrupt transfer and isochronous transfer with the host 102, the circuitry 120 is to not take into account the class functions, requested data rate (e.g., requested bandwidth), user defined policy associated with the devices 108a, 108b, etc., when allocating bandwidth for the devices 108a, 108b. For example, as the interrupt transfer and isochronous transfer (and control transfer) are relatively time sensitive (e.g., compared to asynchronous transfer), the circuitry 120 is to guarantee bandwidth to the devices 108a, 108b.

Also, assume that the devices 108c, 108d, and 108d are to perform asynchronous transfer with the host 102. Accordingly, the circuitry 120 may take into account output of the circuitry 118, 116, while allocating bandwidth for the devices 108c, 108d, 108e. As the devices 108c, 108d, 108e can tolerate some delay relative to the devices 108a, 108b (e.g., as the devices 108c, 108d, 108e are performing asynchronous transfer), the circuitry 120 may allocate bandwidth to devices 108c, 108d, 108e using, for example, weighted round robin scheme, where the weights may be based on the output of the circuitry 116.

Figure 2:
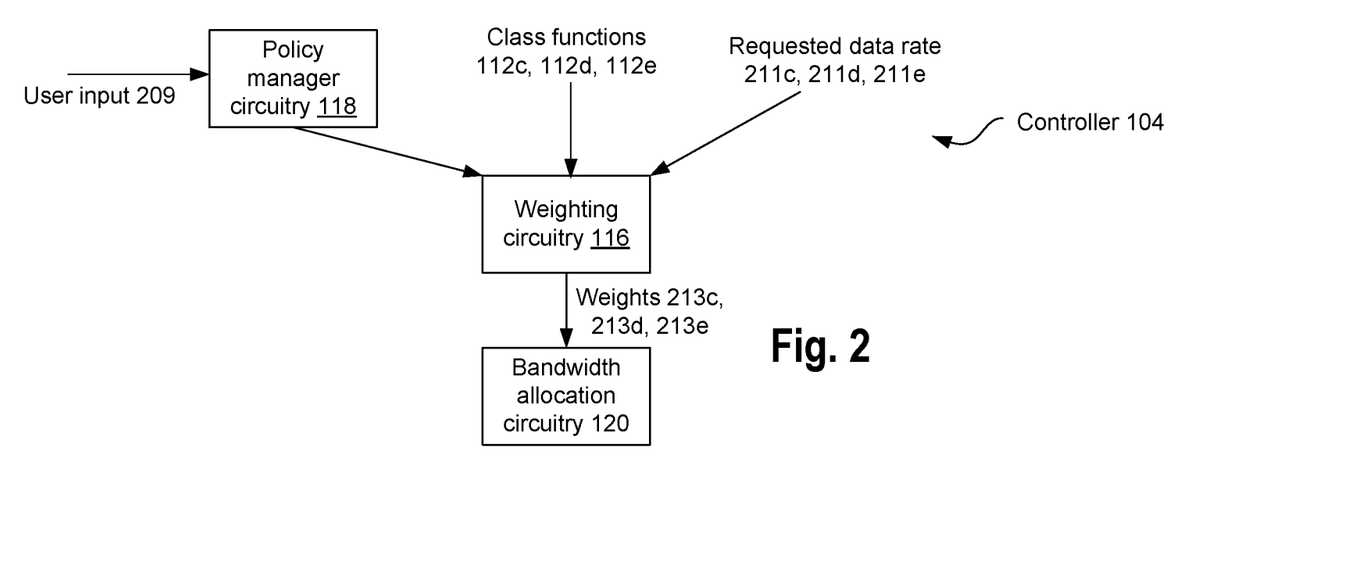
FIG. 2 illustrates factors involved in bandwidth allocation to devices engaged in asynchronous transfer with the host of FIG. 1, according to some embodiments.

FIG. 2 illustrates factors involved in bandwidth allocation to devices performing asynchronous transfer with the host 102 of FIG. 1, according to some embodiments. In FIG. 2, the above discussed example scenario is considered, where it is assumed that devices 108a, 108b are to engage in interrupt transfer and isochronous transfer, respectively, with the host 102; and devices 108c, 108d, 108e are to engage in asynchronous transfer with the host 102.

In some embodiments, the circuitry 118 may receive user input 209, where the user input 209 may request the host 102 to prioritize one device over another (or one class function over another). In some embodiments, the circuitry 116 may receive class functions 112c, 112d, 112e of the device 108c, 108d, 108e, respectively. In some embodiments, the circuitry 116 may also receive requested data rate 211c, 211d, 211e from the device 108c, 108d, 108e, respectively. The requested data rate 211c, 211d, 211e may be bandwidth requested by the 108c, 108d, 108e, respectively.

In some embodiments, the circuitries 116 may take into account some, or all, of the output of the circuitry 118, class functions 112, or requested data rates 211. Based on one or more of these factors, the circuitry 116 may determine weights 213*c*, 213*d*, 213*e* for the devices 108*c*, 108*d*, 108*e*, respectively. The circuitry 116 may transmit the weights 213 to the circuitry 120.

It may be noted that as the devices 108*a*, 108*b* are to respectively perform interrupt transfer and isochronous transfer, in some examples, the circuitry 116 may not determine weights 231*a*, 231*b* corresponding to the devices 108*a*, 108*b*. Thus, the circuitry 116 may not assign any weight to the devices 108*a*, 108*b* for purposes of bandwidth allocation (e.g., as the devices 108*a*, 108*b* are to engage in a transfer type that is different from asynchronous transfer).

In some other examples, the circuitry 116 may determine weights 231*a*, 231*b* corresponding to the devices 108*a*, 108*b*, where the circuitry 116 may assign relatively high weights (e.g., highest possible weights) for the devices 108*a*, 108*b*. As the weights 231*a*, 231*b* are relatively high (e.g., higher than the weights 231*c*, 231*d*, 231*e*), the circuitry 120 may prioritize allocation of bandwidths to the devices 108*a*, 108*b*, e.g., over the devices 108*c*, 108*d*, 108*e*. In such examples where the circuitry 116 determines weights 231*a*, 231*b* corresponding to the devices 108*a*, 108*b*, the circuitry 116 may assign relatively high weights (e.g., highest possible weights) for the devices 108*a*, 108*b*, irrespective of the class types of the devices 108*a*, 108*b*, e.g., as the devices 108*a*, 108*b* are to engage in a transfer type that is different from asynchronous transfer.

In some embodiments, once the controller 120 receives the weights 231*c*, 231*d*, 231*e* (e.g., without the weights 231*a*, 231*b*, or with these weights having a high allocated values), the controller 120 may perform weighted round robin scheduling (or another appropriate weighted scheduling algorithm) to allocate bandwidths to the devices 108*c*, 108*d*, 108*e*, based at least in part of the corresponding weights.

For example, assume that the device 108*c* is a USB flash drive, which is a mass storage class; and assume that the devices 108*d*, 108*e* are USB displays, which are audio/video devices class. As discussed, the devices 108*c*, 108*d*, 108*e* may use asynchronous transfer with the host 102.

As discussed, asynchronous transfer may guarantee delivery, but may not guarantee bandwidth, as asynchronous transfer may be tolerant to some delay. However, the flash drive device 108*c* (e.g., which are mass storage class) may be more delay tolerant than the display devices 108*d*, 108*e* (e.g., which are audio/video devices class).

In a conventional system (e.g., a system that lacks the circuitry 116, 118), the circuitry 120 may be aware that the devices 108*c*, 108*d*, 108*e* are using asynchronous transfer, and hence, the circuitry 120 may allocate bandwidth to the devices 108*c*, 108*d*, 108*e* using round robin (e.g., without prioritizing one device over another). However, the circuitry 116 of this disclosure may take into account various factors associated with the devices 108*c*, 108*d*, 108*e* to determine the weights 231*c*, 231*d*, 231*e*, based on which the circuitry 120 may allocate bandwidth to the devices 108*c*, 108*d*, 108*e* using weighted round robin (e.g., by at least in part prioritizing one device over another).

For example, the circuitry 116 may receive the class functions 112*c*, 112*d*, 112*e*, which may indicate that the flash drive device 108*c* is a mass storage class, and the display devices 108*d*, 108*e* are audio/video devices class. The class type of a device may be indicative of delay tolerance of the device. For example, the audio/video devices class may have less delay tolerance than the mass storage class (e.g., data transfer from a flash storage may be less delay sensitive than data transfer to a display). Accordingly, merely as an example, the circuitry 116 may be configured to assign higher weights to audio/video devices class than mass storage class.

In some embodiments, the circuitry 116 may, for each of a plurality of class functions, have a corresponding weight or priority stored in a table (e.g., in a look up table format, or in another appropriate format), and the circuitry 116 may use such a table to assign weights to devices using asynchronous transfer. Merely as an example, the audio/video devices class may have higher weight or priority than the mass storage class, and the mass storage class may have higher weight than the printer class.

In some embodiments, the circuitry 116 may also take into account the requested data rate 211, while assigning the weights 213. For example, assume that the display device 108*d* has a display resolution of 4K resolution (e.g., which may refer to a horizontal screen display resolution in the order of 4,000 pixels) and the display device 108*e* has a display resolution of 1080p (e.g., has a resolution of 1920× 1080 pixels). Then a data rate 211*d* requested by the 4K resolution display device 108*d* may be higher than a data rate 211*e* requested by the 1080p resolution display device 108*e*. Accordingly, merely as an example, the circuitry 116 may assign the device 108*d* a higher weight 213*d* than the weight 213*e* of the device 108*e*.

In some embodiments, the manner in which the circuitry 116 assigns weights 213 may be user configurable via the circuitry 118. For example, the circuitry 118 may receive user input 209 (e.g., via one or more appropriate user interfaces), which may prioritize one device over another (or one device class over another). Such prioritization by the user may be static (e.g., once the user sets the priority, the user may not change the priority), or may be dynamic (e.g., the user may often change the priority, based on a usage of the devices). The use preferences may change a default priority set by the operating system or set by the USB architecture.

Merely as an example, if transferring data from a flash storage to the host 102 is more important to a user than a resolution of a display, the user input 209 may specify higher priority for the mass storage class than the audio/video devices class. The circuitry 118 may communicate such user preferences to the circuitry 116, based on which the circuitry 116 may provide higher weight 213*c* of the flash drive device 108*c* than the weight 213*d*, 213*e* of the display devices 108*d*, 108*e*.

Figure 3A:
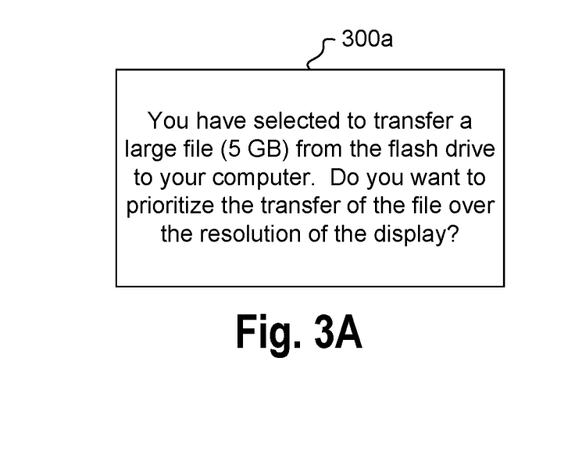
FIGS. 3A-3C illustrate example user interfaces (UIs) requesting user input for prioritizing bandwidth allocation to various USB devices of the system of FIG. 1, according to some embodiments.
Figure 3B:
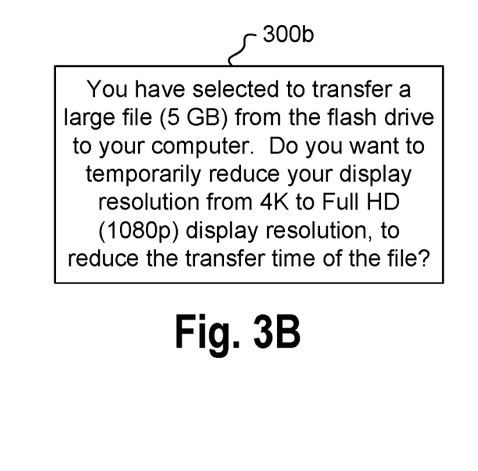
Figure 3C:
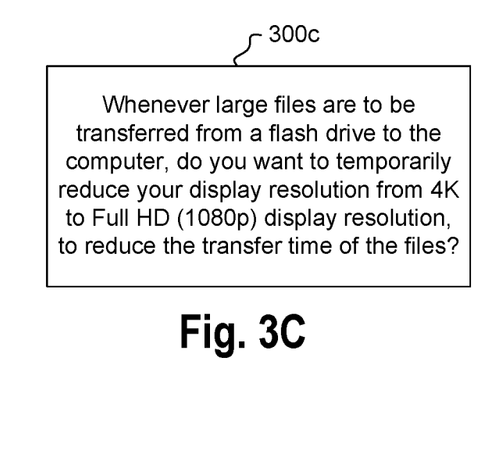

FIGS. 3A-3C illustrate example user interfaces (UI) 300*a*, 300*c*, 300*d*, requesting user input for prioritizing bandwidth allocation to various USB devices 108 of the system 100 of FIG. 1, according to some embodiments. For example, the host 102 may display to the user one or more of the UIs 300*a*, 300*b*, 300*c*. The user may respond by selecting an appropriate option (the options are not illustrated in the UIs 300), and the selected option may be received by the circuitry 118 as user input 209. The circuitry 118 to transmit the user input 209 to the circuitry 116, based at least in part on which the circuitry 116 may assign the weights 213*c*, 213*d*, 213*e*.

The contents of the UIs 300*a*, 300*b*, 300*c* are self-explanatory, and hence, not discussed in further details. The contents of the UIs 300*a*, 300*b*, 300*c* are merely examples, and any appropriate variations and/or extensions of the contents may be easily envisioned by those skilled in the art, based on the teachings of this disclosure.

Figure 4:
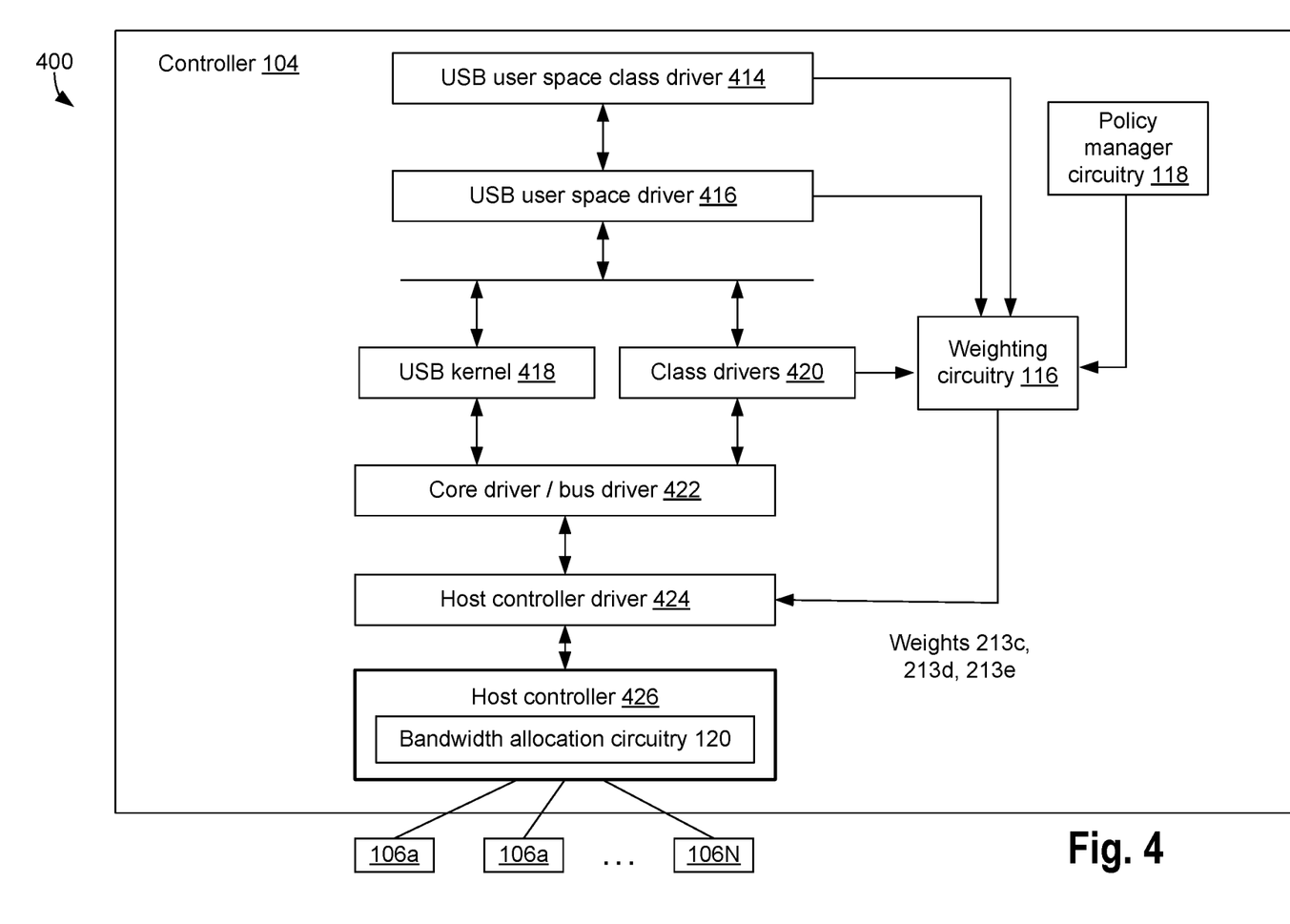
FIG. 4 illustrates an example implementation of a controller of the system of FIG. 1, according to some embodiments.

FIG. 4 illustrates an example implementation 400 of the controller 104 of the system 100 of FIG. 1, according to some embodiments. Specifically, in the implementation of FIG. 4, the controller 104 acts as a USB host system architecture, where the system is a partitioned to different layers. The controller 104 includes a host controller 426, which may include the circuitry 120. The host controller 426, among other things, controls bandwidth allocation to the ports 106a, 106b, ..., 106N.

The controller 104 comprises a transport layer comprising, for example, a USB kernel 418, class drivers 420, core/bus driver 422, host controller driver 424, and/or the host controller 426. In some embodiments, the controller 104 may also comprise USB user space class drivers 414 and/or USB user space drivers 416. General operation of the USB kernel 418, class drivers 420, core/bus driver 422, host controller driver 424, USB user space class drivers 414, and USB user space drivers 416 are known to those skilled in the art, and hence, at least some of these components may not be discussed in further details. These components may facilitate the functionality of the host controller 426, which complies with the transport requirement of the USB architecture.

In some embodiments, the controller 104 comprises the weighting circuitry 116. In an example, one or more of the USB user space driver 414, the USB user space driver 416, or the class drivers 420 may have class function information and/or requested data rate information of the devices 108 coupled to the ports 106. In some embodiments, one or more of the USB user space driver 414, the USB user space driver 416, or the class drivers 420 may transmit the class functions and/or the requested data rate of the devices 108 (e.g., may transmit the class functions and/or the requested data rate of one or more of the devices 108 that are to perform asynchronous transfer with the host 102) to the circuitry 116. The controller 104 may also include the policy manager circuitry 118, which may receive the user input 209, and which may transmit user preferences to the circuitry 116 (e.g., as discussed with respect to FIG. 2).

Thus, the circuitry 116 may receive class type and the requested data rate of various devices 108, and may also receive user preferences. In some embodiments and as discussed with respect to FIG. 2, the circuitry 116 may determine weights for various devices 108 (e.g., determine weights of devices 108 that are to perform asynchronous transfer with the host). The host controller 426 (e.g., the circuitry 120) may then allocate bandwidth to devices 108 that are to perform asynchronous transfer, using weighted round robin (or another appropriate weighted bandwidth allocation scheme), where the weights (e.g., weights 213c, 213d, 213e, as discussed with respect to FIG. 2) for various devices (e.g., devices 108c, 108d, 108e, as discussed with respect to FIG. 2) are received from the circuitry 116. The weights 213 may be received by the host controller 426 from the circuitry 116 via the host controller driver 424, as illustrated in FIG. 4.

For example, if multiple devices (e.g., devices 108c, 108d, 108e, as discussed with respect to FIG. 2) are to perform asynchronous transfer, then multiple queues corresponding to the multiple devices are formed (e.g., in the host 102 and/or in the devices 108). The weighting circuitry 116 assigns the weight 213c to the queue for the device 108c, assigns the weight 213d to the queue for the device 108d, and assigns the weight 213e to the queue for the device 108e. The circuitry 120 then allocates bandwidths to these queues based on the weights, e.g., using weighted round robin.

For devices not performing asynchronous transfer (e.g., devices 108a, 108b that are performing interrupt transfer and isochronous transfer, respectively), the circuitry 120 assigns bandwidth on a priority basis (e.g., irrespective of the class type, requested data rate, or user preferences for these devices). For example, devices 108a, 108b are assigned bandwidth initially, and any remaining bandwidth are assigned among the devices 108c, 108d, 108e (which are performing asynchronous transfer) based on the weighted round robin scheduling.

In a conventional USB architecture, a host controller is merely a transport medium, with no knowledge on the class function of the devices attached to the USB ports, and the bandwidth requirements of the devices. Thus, in such a conventional USB architecture, the host controller may guarantee bandwidth to control transfer, interrupt transfer, and isochronous transfer, while performing a round robin process to allocate bandwidth to devices for asynchronous transfer (e.g., without taking into account class of the devices, requested data rate of the devices, and/or user preference, while performing the round robin process to allocate bandwidth to devices for asynchronous transfer). Thus, in such a conventional system, the host controller does not have the intelligence to take advantage of the class information, data rate information, and/or user preference in allocating bandwidth for asynchronous transfers.

In contrast, as discussed herein, the host controller 426 comprising the circuitry 120 uses weights from the circuitry 116 to intelligently allocate bandwidth for asynchronous transfers, taking into account the class types of various devices, requested data rate of various devices, and/or user preferences, thereby leading to a better utilization of bandwidth, faster transfer of data, reduced latency in critical devices (e.g., devices having higher weights), enhanced user experience, etc.

Figure 5:
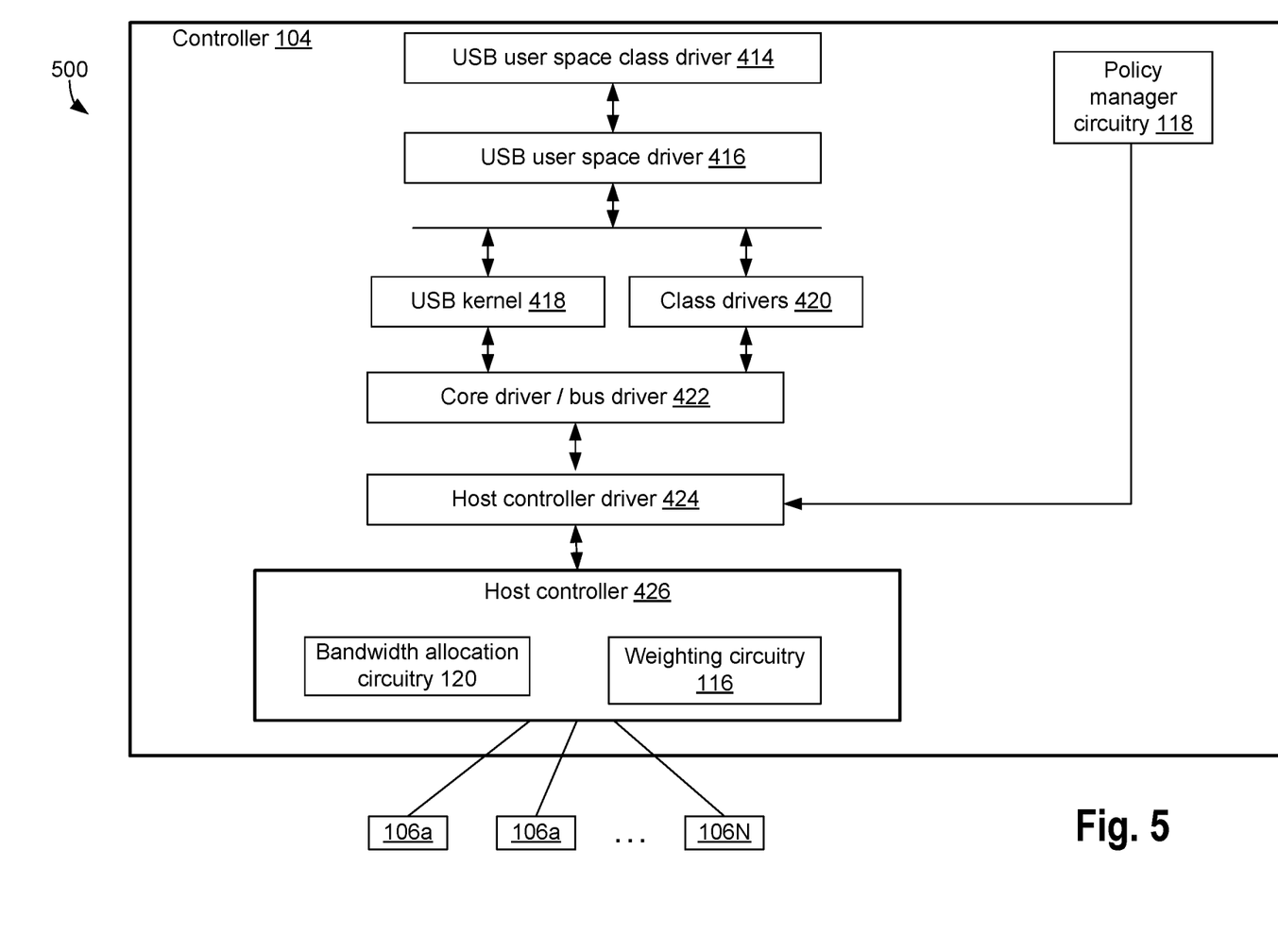
FIG. 5 illustrates another example implementation of the controller of the system of FIG. 1, according to some embodiments.

FIG. 5 illustrates another example implementation 500 of the controller 104 of the system 100 of FIG. 1, according to some embodiments. The implementation of the controller 104 in FIGS. 4 and 5 are at least in part similar. However, unlike FIG. 4, in the implementation of FIG. 5 the circuitry 116 may be combined or integrated within the host controller 426. In such an implementation, the host controller 426 may receive user input 209 via the circuitry 118 and the host controller driver 424. The host controller 426 may also receive requested data rate and/or class functions of various devices (e.g., devices 108c, 108d, 108e, which are to perform asynchronous transfer) from the USB user space class drivers 414, USB user space drivers 416, and/or class drivers 420.

In some embodiments, the circuitry 116 may determine the weights 213, which may be used by the circuitry 120 for weighted round robin for allocation of bandwidth to the devices 108 that perform asynchronous transfer. In some embodiments where the circuitries 120 and 116 are combined, the combined circuitry may directly use the user input 209, the requested data rate, and/or the class function 213 to implement the weighted round robin scheduling for allocation of bandwidth to the devices 108 that perform asynchronous transfer.

Figure 6:
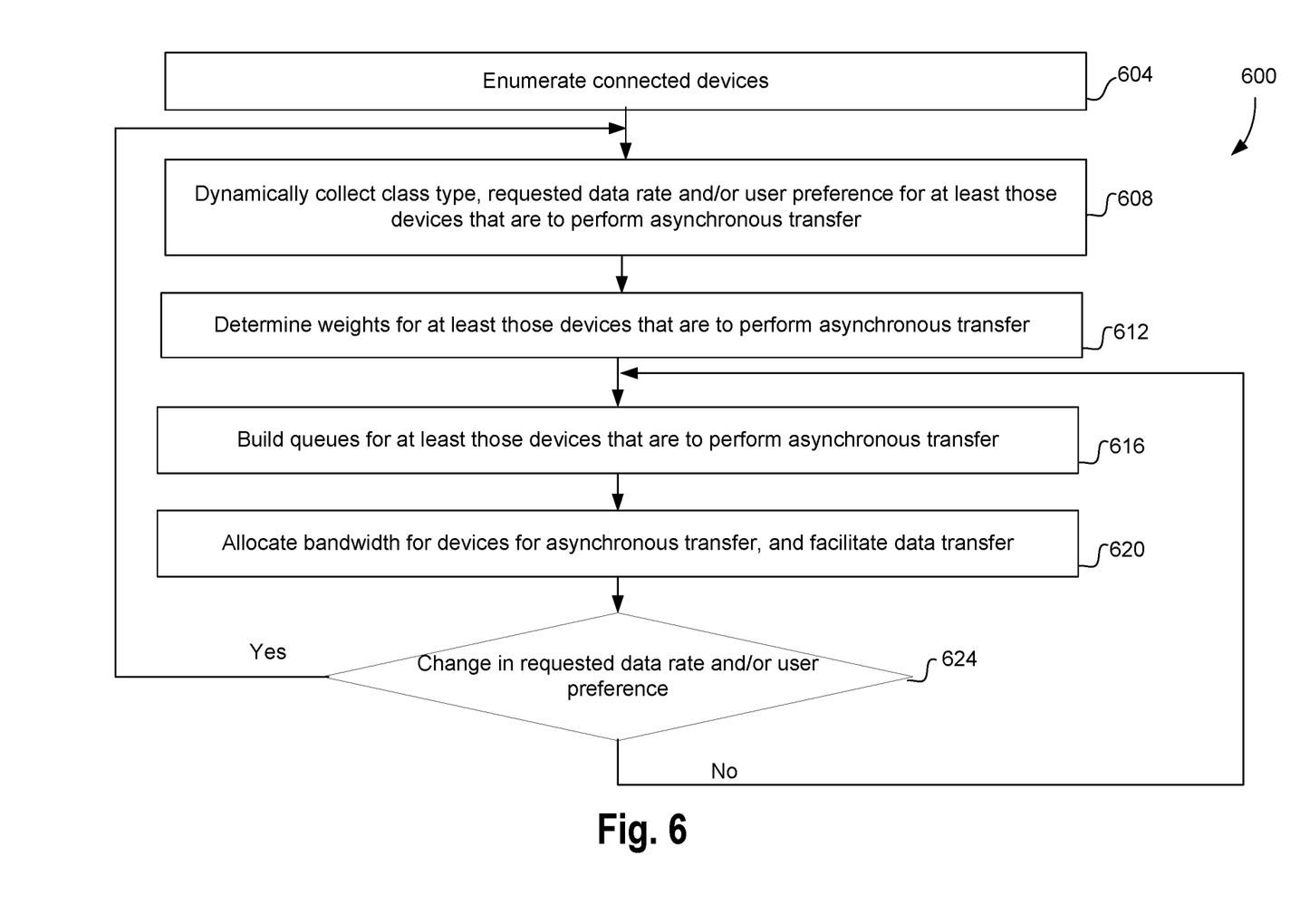
FIG. 6 illustrates a flowchart depicting a method for allocating bandwidth to devices performing asynchronous transfer with the host of FIG. 1, based at least in part of one or more of: class types of the devices, requested data rate of the devices, or user preferences, according to some embodiments.

FIG. 6 illustrates a flowchart depicting a method 600 for allocating bandwidth to devices 108 (e.g., devices 108c, 108d, 108e, as discussed with respect to FIG. 2) performing asynchronous transfer with the host 102, based at least in part of one or more of: class types of the devices, requested data rate of the devices, or user preferences, according to some embodiments. Although the blocks in the flowchart with reference to FIG. 6 are shown in a particular order, the order of the actions can be modified. Thus, the illustrated embodiments can be performed in a different order, and some actions/blocks may be performed in parallel. Some of the blocks and/or operations listed in FIG. 6 may be optional in accordance with certain embodiments. The numbering of the blocks presented is for the sake of clarity and is not intended to prescribe an order of operations in which the various blocks must occur.

At 604, devices 108 connected to the ports 106 are enumerated. At 608, class types, requested data rates and/or user preference for at least those devices that are to perform asynchronous transfer (e.g., devices 108c, 108d, 108e, as discussed with respect to FIG. 2) are collected (e.g., by the circuitry 116). At 612, weights for at least those devices that are to perform asynchronous transfer are determined (e.g., by the circuitry 116).

At 616, queues for at least those devices that are to perform asynchronous transfer are built. The queues may be on the host 102 and/or on the devices 108. At 620, bandwidth for devices for asynchronous transfer are allocated (e.g., by circuitry 120), and data transfer between the host 102 and these devices are facilitated (e.g., by the host controller 426).

In some embodiments, one or both of requested data rate of the devices or user preferences may change over time. At 624, it may be determined if there is any such change (e.g., by the circuitry 116). In case of any such change (e.g., if "Yes" at 624), the method 600 may loop back to 608. If "No" at 624, the method 600 may loop back to 616, where the queues are re-built (e.g., as and when new data packets arrive at the queue).

Various examples and embodiments of this disclosure discuss taking into account class functions, requested data rate (e.g., requested bandwidth), user defined policy associated with the devices 108a, 108b, etc., when allocating bandwidth for the devices 108a, 108b (e.g., when allocating bandwidth for the devices 108 that are to perform asynchronous transfer). In some embodiments, one or more other criteria may also be taken into account when allocating bandwidth for the devices 108 that are to perform asynchronous transfer. For example, a priority of a thread or transport task may also be taken into account when allocating bandwidth for the devices 108 that are to perform asynchronous transfer. Thus, the priority of the thread or transport task may be taken into account when determining the weights at 612 of method 600 of FIG. 6. For example, when a thread or a task is to be executed by a USB device, the operating system (OS) may assign a priority to the thread or task, which the circuitry 120 may consider while allocating bandwidth. Merely as an example, if a first thread or task is associated with operations of the OS and a second thread or task is associated with transferring a movie from a USB flash storage to a hard drive, the OS may assign a relatively higher priority to the first thread or task, which may be reflected in the bandwidth allocation by the circuitry 120.

Figure 7:
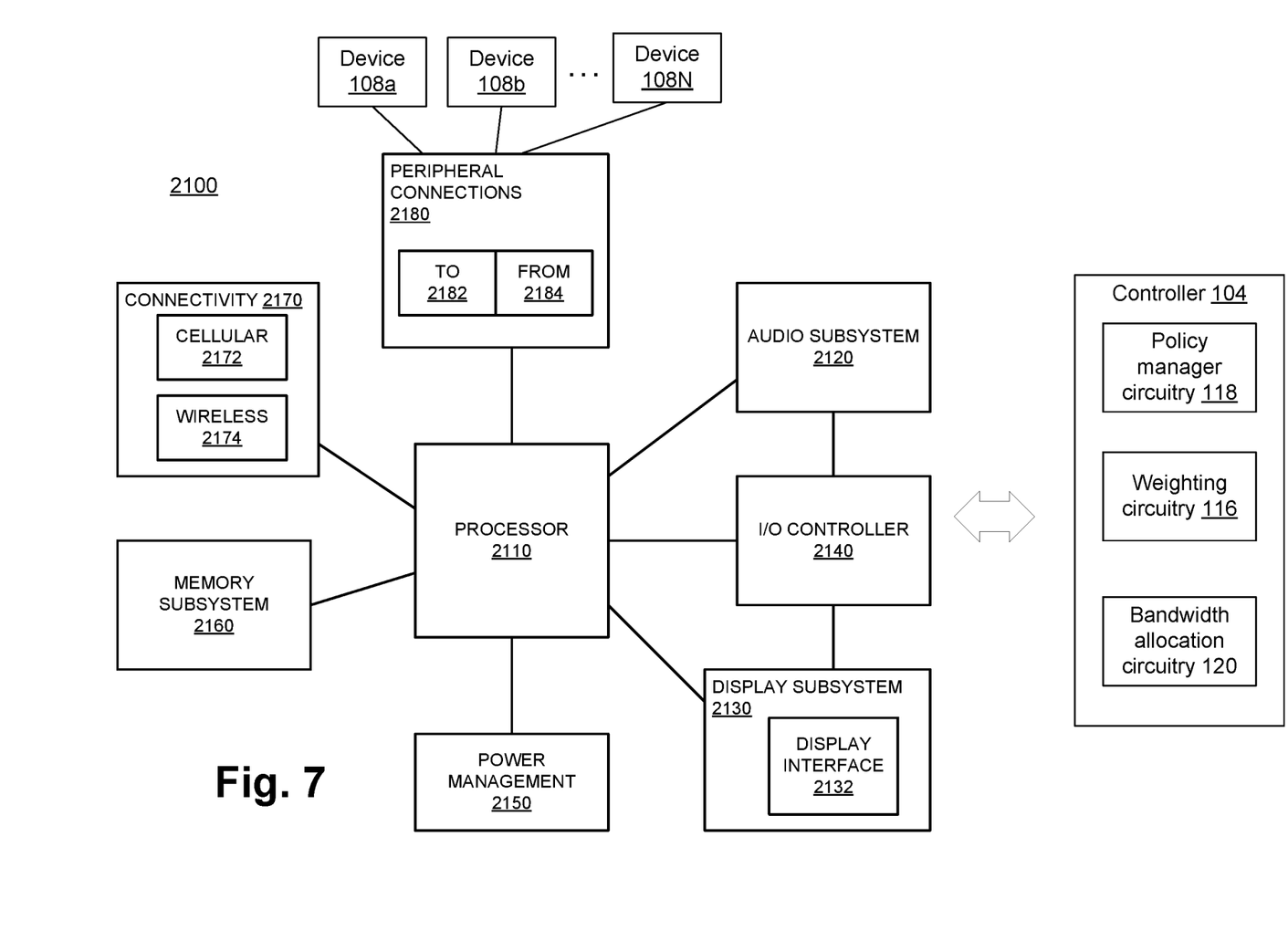
FIG. 7 illustrates a computer system, a computing device or a SoC (System-on-Chip), where bandwidth to various devices connected to the computing device (e.g., devices performing asynchronous transfer) are allocated, based at least in part of one or more of: class types of the devices, requested data rate of the devices, or user preferences, according to some embodiments.

FIG. 7 illustrates a computer system, a computing device or a SoC (System-on-Chip) 2100, where bandwidth to various devices 108 connected to the computing device 2100 (e.g., devices 108c, 108d, 108e engaged in asynchronous transfer, as discussed with respect to FIG. 2) are allocated, based at least in part of one or more of: class types of the devices, requested data rates of the devices, or user preferences, according to some embodiments. It is pointed out that those elements of FIG. 7 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise the controller 104, which includes the circuitries 116, 118, and/or 120. Devices 108*a*, 108*b*, . . . , 108N may be coupled to the computing device 2100 via, for example, the peripheral connections 2180. The controller 104 may allocate bandwidth to various devices 108 connected to the computing device 2100 (e.g., devices 108*c*, 108*d*, 108*e* that perform asynchronous transfer, as discussed with respect to FIG. 2), based at least in part of one or more of: class types of the devices, requested data rate of the devices, or user preferences, e.g., as discussed with respect to FIGS. 1-6 of this disclosure.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

All optional features of the apparatus described herein may also be implemented with respect to a method or process.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a plurality of input/output (I/O) ports, wherein a first I/O port, a second I/O port, and a third I/O port are to be respectively coupled to a first device, a second device, and a third device; and
a controller, coupled to the plurality of I/O ports, to:
identify a first class type of the first device, a second class type of the second device, and a third class type of the third device, wherein the first class type, the second class type, and the third class type, respectively, indicate a first delay tolerance of the first device, a second delay tolerance of the second device, and a third delay tolerance of the third device;
determine that the first device and the second device are each to perform a respective asynchronous transfer with the apparatus, and that the third device is to perform with the apparatus a transfer of a transfer type other than an asynchronous transfer type;
assign a first weight to the first device based on the first class type, and a second weight to the second device based on the second class type; and
allocate bandwidth to the first I/O port and the second I/O port based at least in part on the first weight and the second weight, wherein the controller is to allocate bandwidth to the third I/O port independent of the third class type.

2. The apparatus of claim 1, wherein the third device is to perform the transfer that is one of: a control transfer, an interrupt transfer, or an isochronous transfer.

3. The apparatus of claim 1, wherein the plurality of I/O ports comprise one or more Universal Serial Bus (USB) ports.

4. The apparatus of claim 1, wherein:
the controller is to determine the first weight further based on at least in part on one or more of: a first data rate requested by the first device, or user preferences; and
the controller is to determine the second weight further based on at least in part on one or more of: a second data rate requested by the second device, or the user preferences.

5. The apparatus of claim 4, wherein:
the controller is to allocate bandwidth to the first I/O port and the second I/O port using weighted round robin scheduling, where the weighted round robin is based at least in part on the first weight and the second weight.

6. The apparatus of claim 1, wherein the controller is to allocate bandwidth to the first I/O port and the second I/O port in response to the determination that—the first device and the second device are each to perform a respective asynchronous transfer with the apparatus.

7. The apparatus of claim 1, wherein the controller is to guarantee delivery, and refrain from guaranteeing bandwidth, to the first device and the second device.

8. The apparatus of claim 1, wherein the controller is to allocate bandwidth to the first I/O port and the second I/O port based further at least in part on a first data rate requested by the first device and a second data rate requested by the second device.

9. The apparatus of claim 1, wherein the controller is to allocate bandwidth to the first I/O port and the second I/O port based further at least in part on user preferences.

10. The apparatus of claim 9, wherein:
the controller is to store a first default priority for the first class type and a second default priority for the second class type; and
the controller is to alter one or both the first default priority or the second default priority, based on the user preferences.

11. The apparatus of claim 1, wherein the asynchronous transfer to be performed by the first and second devices is less delay sensitive than the transfer type performed by the third device.

12. The apparatus of claim 1, wherein the first, second, and third class types are in accordance with the Universal Serial Bus (USB) device class specification.

13. A system comprising:
a memory to store instructions;
a processor coupled to the memory, the processor to execute the instructions;
a plurality of Universal Serial Bus (USB) ports to allow the processor to respectively communicate with a corresponding plurality of devices; and
a controller, coupled to the plurality of USB ports, to:
receive an indication that two or more first devices of the plurality of devices are to communicate with the processor each using a respective bulk transfer, and that one or more second devices of the plurality of devices are to communicate with the processor each using a respective one or more of: control transfer, interrupt transfer, or isochronous transfer; and
assign weights to individual ones of the two or more first devices based on the indication, wherein, for purposes of allocating bandwidth to the one or more second devices, the controller is to refrain from assigning any weight to the one or more second devices based on the indication;
use weighted round robin scheduling to allocate bandwidth to the two or more first devices, based at least in part on the assigned weights.

14. The system of claim 13, wherein the controller is to:
assign a first weight to a first one of the two or more first devices, based at least in part on a first class-function of the first one of the two or more first devices; and
assign a second weight to a second one of the two or more first devices, based at least in part on a second class-function of the second one of the two or more first devices.

15. The system of claim 14, wherein individual ones of the first class-function and the second class-function is one of: an unspecified class, an audio class, a communications and CDC control class, a HID (Human Interface Device) class, a physical class, an image class, a printer class, a mass storage class, a USB Hub class, a CDC-data class, a smart card class, a content security class, a video class, a personal healthcare class, an audio/video devices class, a billboard device class, a USB type-C bridge class, a diagnostic device class, a wireless controller class, a miscellaneous class, an application Specific class, or a vendor specific class.

16. The system of claim 13, wherein the controller is to:
assign a first weight to a first one of the two or more first devices, based at least in part on a first data rate requested by the first one of the two or more first devices; and
assign a second weight to a second one of the two or more first devices, based at least in part on a second data rate requested by the second one of the two or more first devices.

17. The system of claim 13, wherein the controller is to:
assign a first weight to a first one of the two or more first devices and assign a second weight to a second one of the two or more first devices, based at least in part on input received from a user.

18. The system of claim 13, wherein the controller is to:
assign a first priority to a task or thread executed by a first one of the two or more first devices, and a second priority to a task or thread executed by a second one of the two or more first devices; and
assign a first weight to the first one of the two or more first devices and assign a second weight to the second one of the two or more first devices, based at least in part on the first and second priorities, respectively.

* * * * *